United States Patent [19]

Cooper et al.

[11] Patent Number: 5,321,113
[45] Date of Patent: Jun. 14, 1994

[54] COPOLYMERS OF AN AROMATIC ANHYDRIDE AND ALIPHATIC ESTER

[75] Inventors: Kevin L. Cooper, Bridgewater; Angelo G. Scopelianos, Whitehouse Station, both of N.J.

[73] Assignee: Ethicon, Inc., Somerville, N.J.

[21] Appl. No.: 62,865

[22] Filed: May 14, 1993

[51] Int. Cl.$^5$ .................. C08G 67/04; C08G 63/08
[52] U.S. Cl. .................. 528/176; 424/426; 424/445; 424/430; 424/78.06; 424/78.17; 528/193; 528/194; 528/206; 528/207; 528/271; 528/354
[58] Field of Search ............ 528/354, 176, 193, 194, 528/206, 207, 271; 424/426, 78

[56] References Cited

U.S. PATENT DOCUMENTS

| | | | |
|---|---|---|---|
| 4,414,381 | 11/1983 | Griffith et al. | 528/190 |
| 4,757,128 | 7/1988 | Domb et al. | 528/271 |
| 4,857,311 | 8/1989 | Domb | 424/78 |
| 4,888,176 | 12/1989 | Langer et al. | 424/426 |
| 4,938,763 | 7/1990 | Dunn et al. | 424/426 |
| 4,999,417 | 3/1991 | Domb | 528/271 |
| 5,077,049 | 12/1991 | Dunn et al. | 424/426 |
| 5,100,433 | 3/1992 | Bezwada et al. | 606/230 |

FOREIGN PATENT DOCUMENTS

92/13567  8/1992  PCT Int'l Appl.

OTHER PUBLICATIONS

Macromolecules 1992, 25, 1377-1381; Hans R. Kricheldorf and Direk Lubbers: Title: Polyanhydrides. 2. Thermotropic Poly(ester anhydride)s Derived from Terephthalic Acid, Substituted Hydroquinones, and 4-Hydroxybenzoic Acids.
Macromolecules 1991, 24, 2291-2298; Andrea Staubli, Edith Mathiowitz, and Robert Lanager: Title: Sequence Distribution and Its Effect on Glass Transition Temperatures of Poly(anhydrideco-amines) Containing Asymmetric Monomers.
Macromolecules 1991, 24, 2283-2290; Andrea Staubli, Edith Mathiowitz, Melissa Lucarelli, Robert Langer: Title: Characterization of Hydrolytically Degradable Amino Acid Containing Poly(Anhydride-co-imides).
Journal of Controlled Release, 1991, 18, 145-152; Title: In vitro Degradable and Solute Release From Erodible polyanhydride supports containing skeletal B-alanine residues.
Makromol, Chem. Capid Commun. 11, 303-307 (1990); Hans R. Kricheldorf; Direk Lubbers: Title: Thermotropic poly(ester-anydrides)s derived from terephthalic acid and various aromatic hydroxy acids.
J. American Chem. Soc., 1991, 112, 4419-4424; Andrea Staubli, Eyal Ron, and Robert Langer: Title: Hydrolytically Degradable Amino Acid Containing Polymers.
Eur. Polm. J., 28, 887-893; Hans R. Kricheldof and Dierk Lubbers: Title: Polyanhydrides-3. Thermotropic poly(ester-anhydride)s of 2,5-Bis-Alkoyyterephthalic Acids and Unsubstituted Comonomers.
Eur. Pol. J., 27, 1397-1400; Hans R. Kricheldorf and Dierk Lubbers: Title: Polyanhydrides 1. Synthesis of Thermotropic Poly(ester-anhydride)s from Terephthalic acid and Hydroxyacids by Means of Acetic Anhydride.

Primary Examiner—John Kight, III
Assistant Examiner—Shelley A. Dodson
Attorney, Agent, or Firm—Hal B. Woodrow

[57] ABSTRACT

A copolymer of an aromatic anhydride and an aliphatic ester suitable for use in surgical devices and a process for making said copolymer.

20 Claims, 7 Drawing Sheets

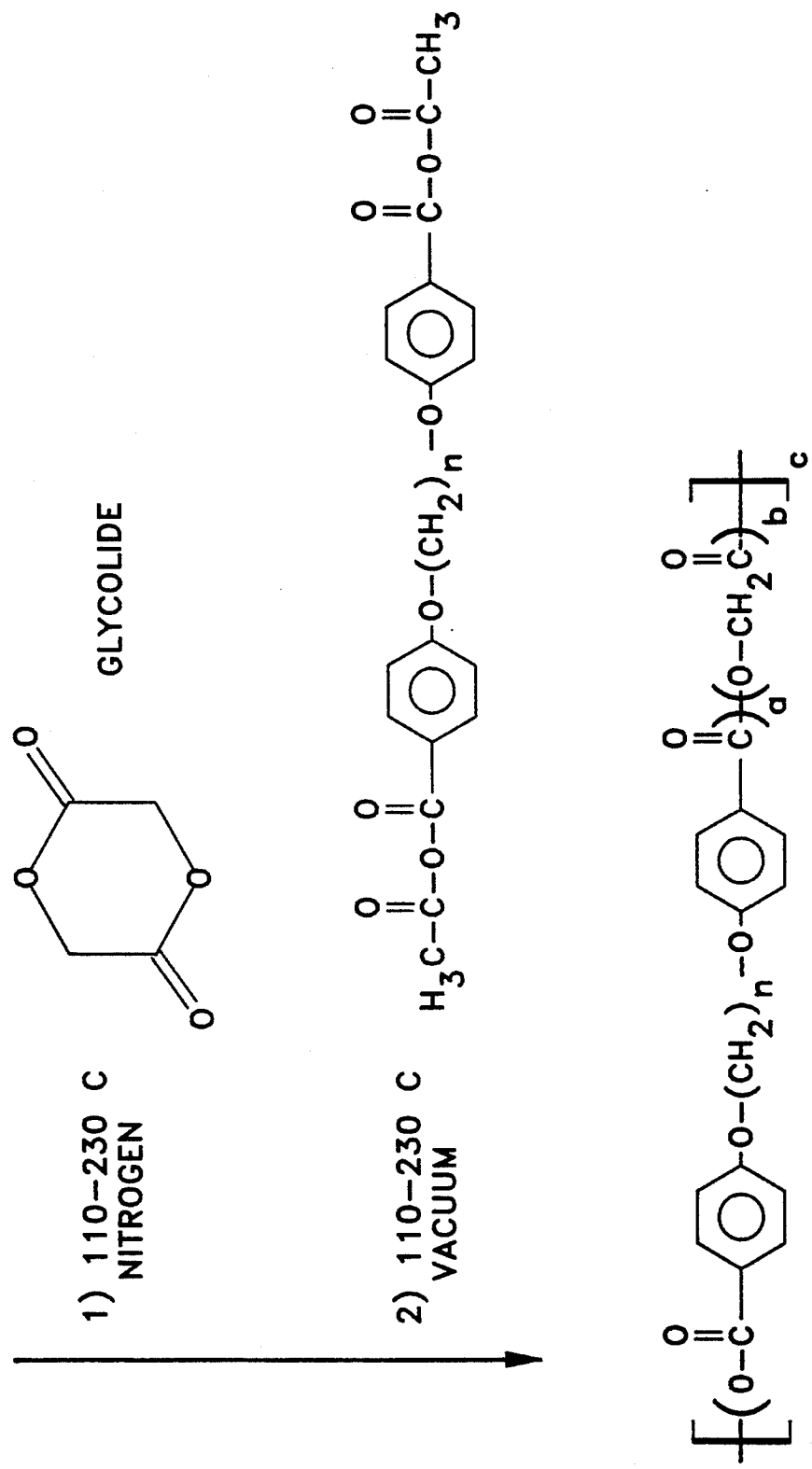
FIG—1  SYNTHESIS OF POLY (ANHYDRIDE—ESTER) COPOLYMERS

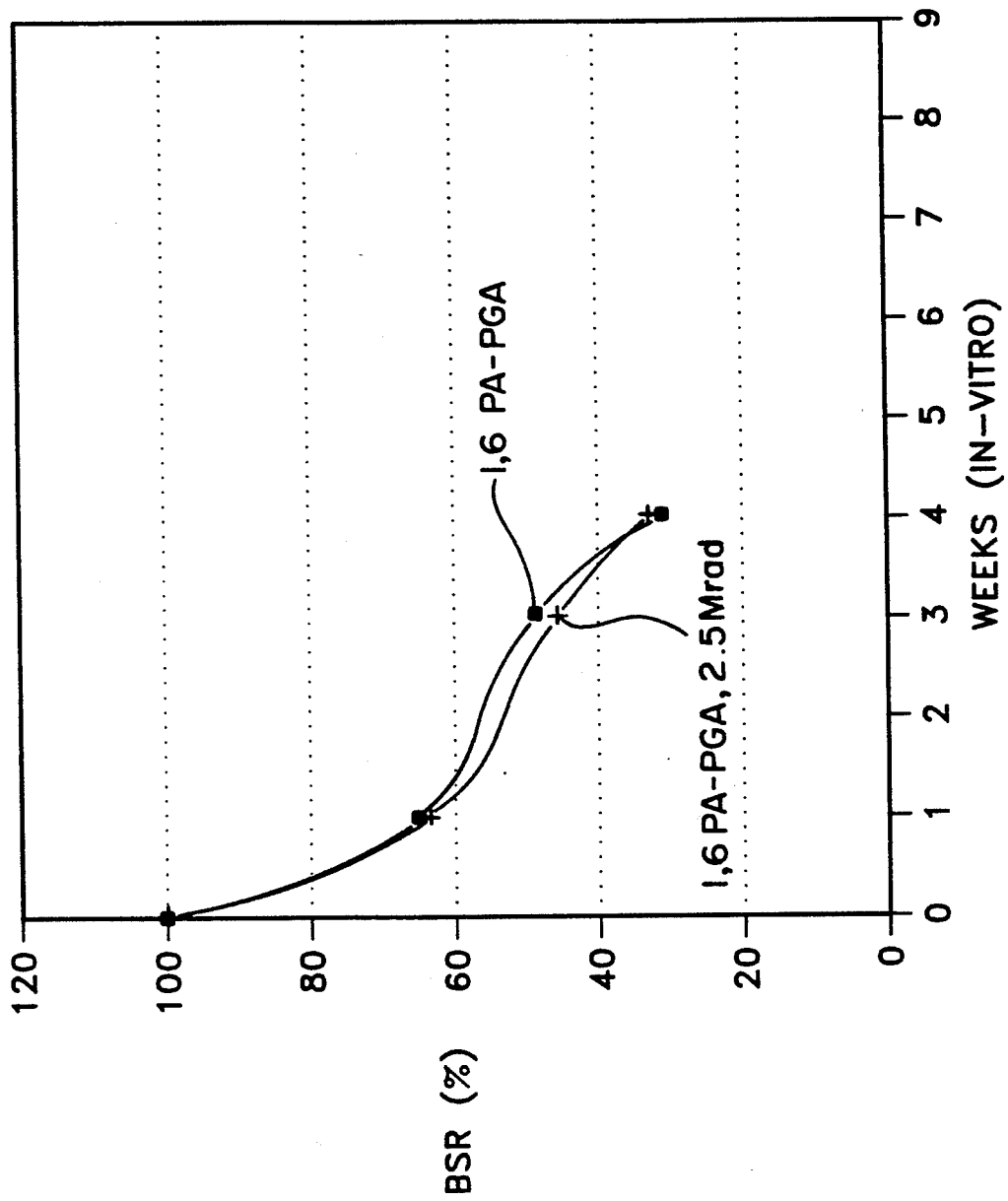
FIG-2 IN-VITRO PROPERTIES OF 1,6 PA-PGA 50-50

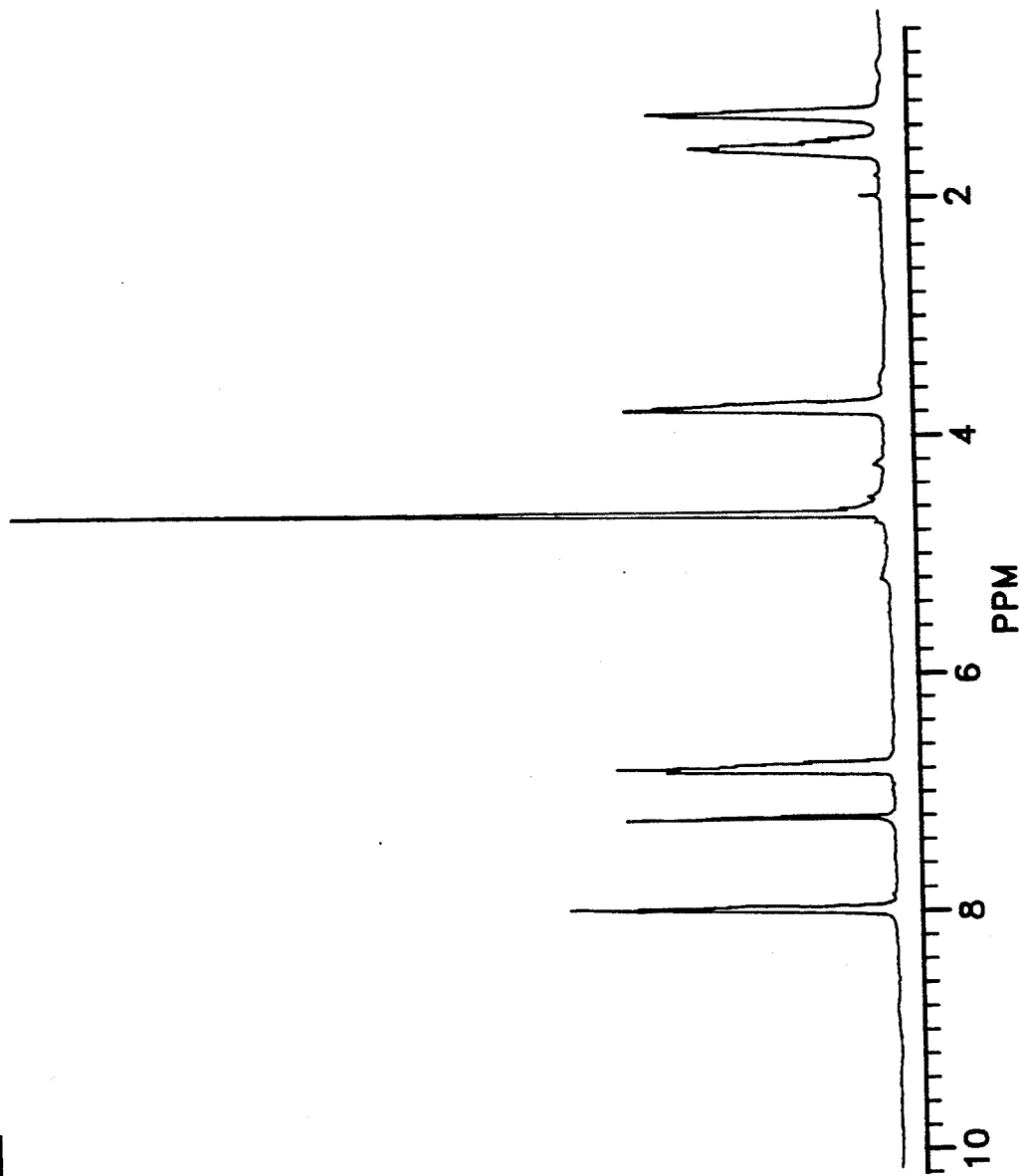
FIG-3  1,6/PGA-PLA

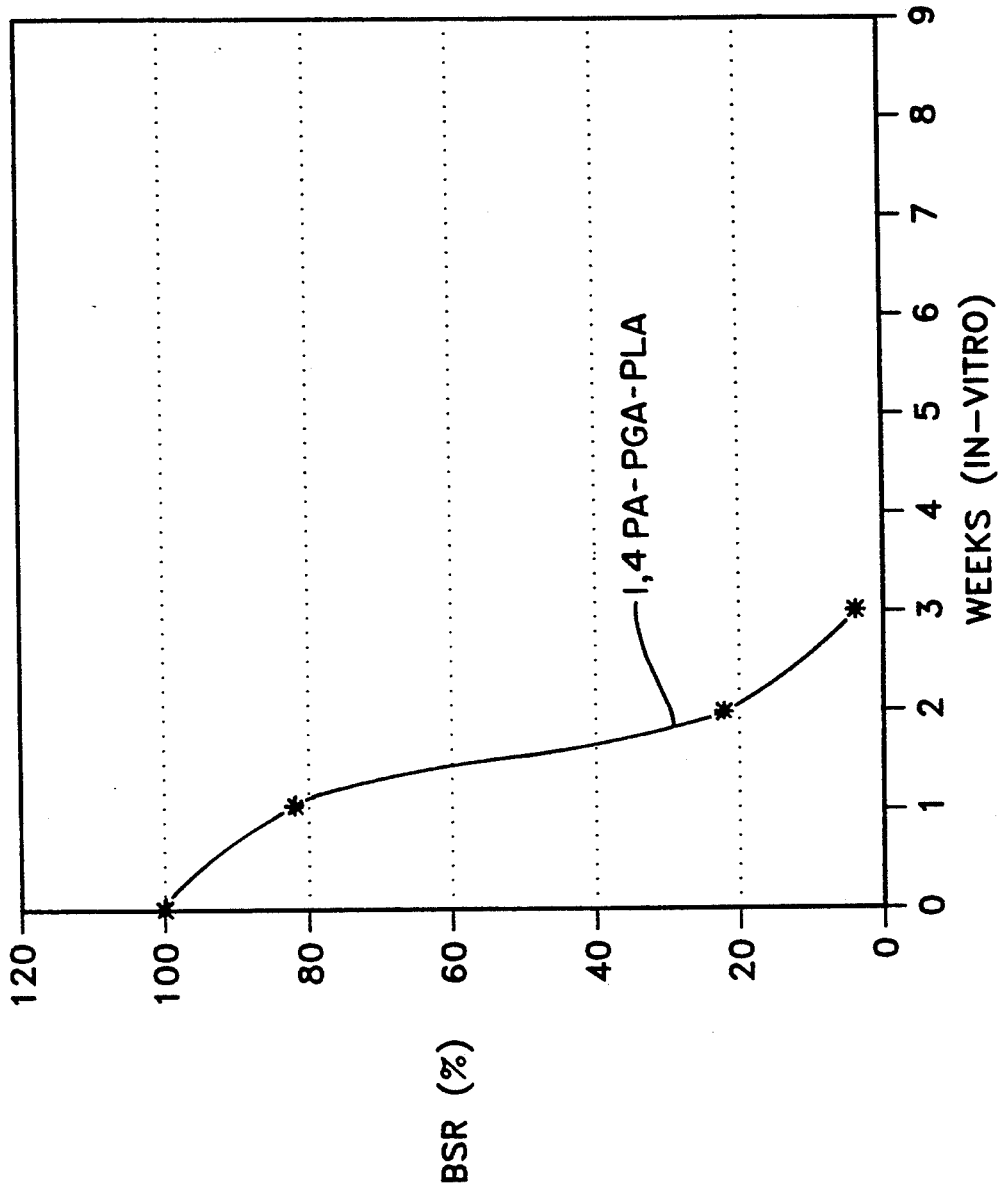
FIG-4 PROPERTIES OF 1,4 PA-(PGA-PLA 90-10) 50-50

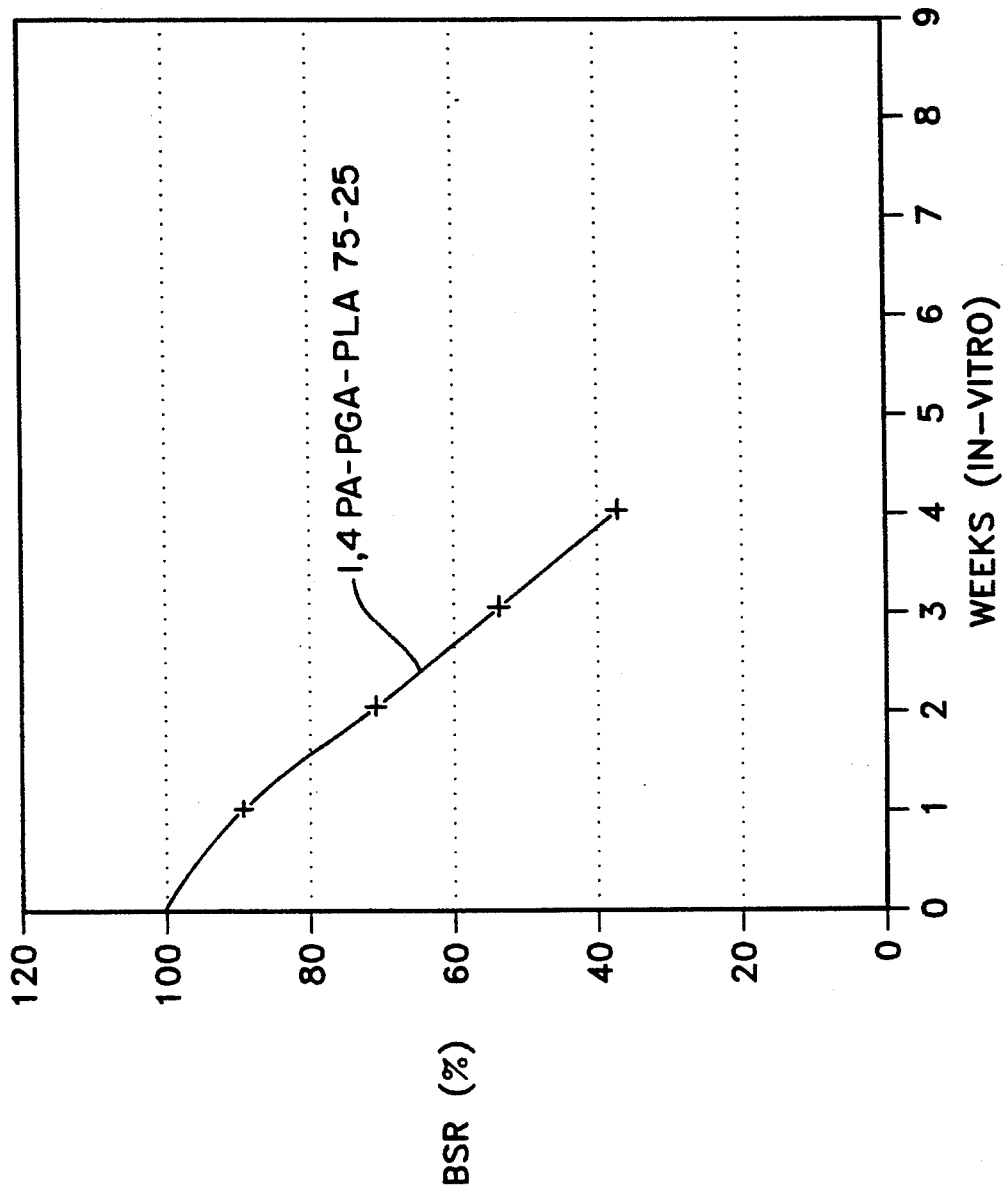

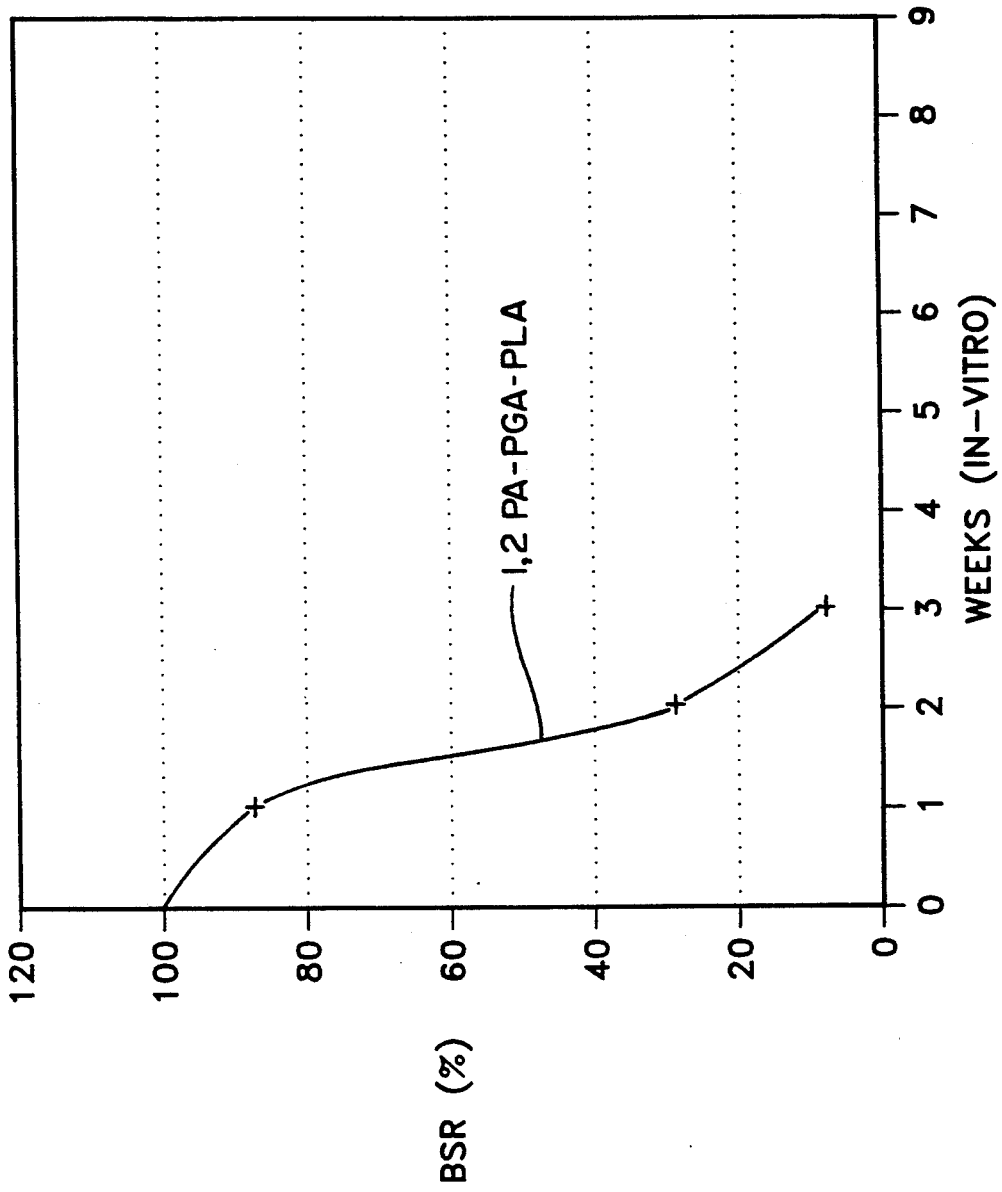
FIG-6  PROPERTIES OF 1,2 PA-(PGA-PLA 90-10) 50-50

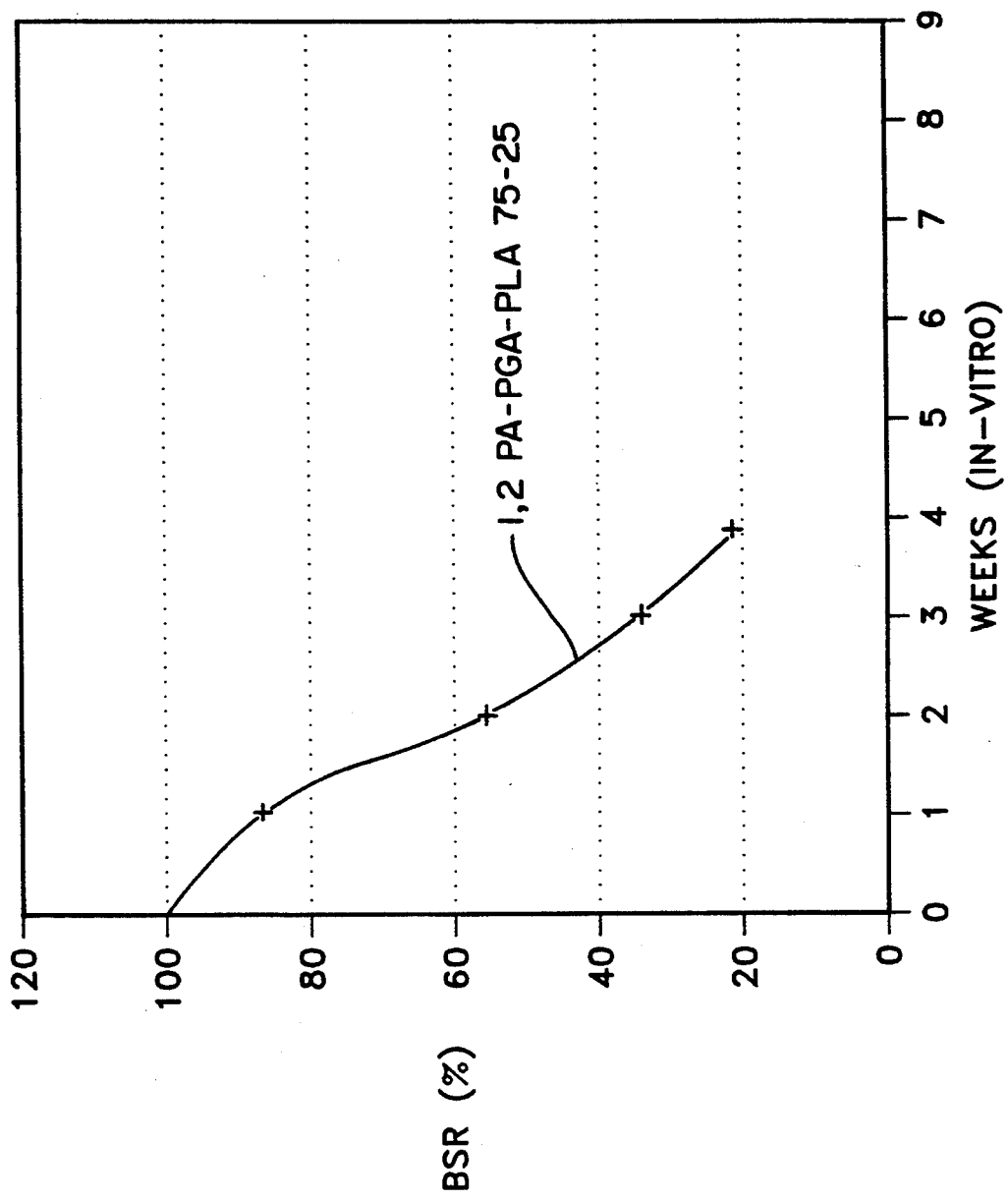

COPOLYMERS OF AN AROMATIC ANHYDRIDE AND ALIPHATIC ESTER

BACKGROUND OF THE INVENTION

This invention relates to copolymers of aromatic anhydrides and aliphatic esters. More specifically, it relates to copolymers of aromatic anhydrides and aliphatic esters particularly well suited for melt processing to prepare biomedical devices, especially wound closure devices.

Polymers of aliphatic and aromatic anhydrides have been extensively studied for many years. As long ago as the 1930's, Carothers had prepared a series of aliphatic polyanhydrides for use as fibers in the textile industry (see J. Am. Chem. Soc., 54, 1569 (1932)). Later, in the mid 1950's, Conix was able to synthesize aromatic polyanhydrides with improved film and fiber forming properties (see J. Polym. Sci., 29 343 (1958)). However, these early attempts to make polyanhydrides with outstanding properties were unsuccessful because these polyanhydrides exhibited poor thermal and hydrolytic stability. Therefore, during this time, no commercial applications of polyanhydrides were found.

More recently polyanhydrides with sustained drug release properties have been made. U.S. Pat. No. 4,757,128, and Domb et al., J. of Polymer Sci., 25, 3373 (1987), disclose the preparation of polyanhydrides from pure, isolated prepolymers of diacids and acetic acid under well defined polymerization reaction conditions of temperature and time, optionally in the presence of a coordination catalyst. The molecular weight of the polyanhydrides prepared from the isolated prepolymers is reported to be higher than that achieved when an unisolated prepolymer mixture is used. However, as stated by Domb et al., the polyanhydrides depolymerize to form a rubbery gel if the polymerization temperature is maintained at elevated temperatures for an extended period of time.

The synthesis techniques described by Domb have lead to the use of polyanhydrides as biodegradable matrices for the controlled release of biologically active substances. See, for example, U.S. Pat. No. 4,857,311, and U.S. Pat. No. 4,888,176. One of the factors which make a polyanhydride particularly well suited as a biodegradable matrix is that it breaks down into biocompatible degradation products based on the monomeric diacids when exposed to moist bodily tissue for extended periods of time. These biocompatible degradation products can be readily passed through the tissue without any significant tissue response or harm to the digestive or vascular systems.

Recent attempts have been made to optimize the synthesis of anhydride copolymers. Specifically, anhydride copolymers which will exhibit longer release and degradation times when used as a matrix for drug release have been studied. U.S. Pat. No. 4,789,724 describes preparing copolymers from individually prepared, isolated prepolymers. Domb, Macromolecules, 25, 12 (1992), describes preparing relatively low molecular weight (I.V.<0.45 dl/g) aromatic copolymers of anhydrides which are highly soluble in conventional solvents, and therefore suitable for the preparation of solvent cast drug release devices.

Although the extensive studies performed by Domb and his colleagues, as described above, have shown the feasibility of preparing cert in polyanhydrides which are suitable as matrices for drug release, this significant class of polyanhydrides are unsuitable for numerous biomedical applications, especially for the preparation of implantable devices for wound closure. Upon a careful review of Domb's work, it becomes apparent that Domb was able to prepare aliphatic polyanhydrides of high molecular weight, but the reported values for the molecular weight of polyanhydrides which are predominately aromatic are too low for conventional melt processing techniques required to make biomedical devices. Although it is possible to prepare drug delivery devices from aliphatic polyanhydrides, it is most likely that it would not be possible to make biomedical devices from the aliphatic polyanhydrides described in Domb due to their poor thermal stability. However, it would be highly desirable to fabricate devices from polymers which can withstand the effects of melt processing and sterilization using conventional melt processing and irradiation techniques. In this regard, the incorporation of aromatic functionality in the polymer chains of the polyanhydride is critical for the application of melt processing to fabricate biomedical devices or the application of irradiation to achieve sterilization. See, for example, U.S. Pat. Nos. 4,435,590, 4,510,295, and 4,546,152, which describe the preparation of polymers for biomedical applications with a high degree of aromatic functionality capable of withstanding the effects of irradiation for sterilization.

Other polymer compositions containing anhydride functionality have been described in the literature. For example, U.S. Pat. No. 4,414,381 describes the preparation of aromatic poly(ester-anhydride) copolymers. These copolymers are described as being melt processable, and useful for preparing fibers, films and molding powders. Unfortunately, these copolymers are not bioabsorbable, and therefore are unsuitable for numerous implantable, medical device applications.

The failure of Domb and others to synthesize bioabsorbable, aromatic polyanhydride polymers with high molecular weights limits the suitability of such polyanhydrides to their use as biomedical devices. Additionally, it would be highly desirable to develop aromatic polyanhydride containing polymers, such as aliphatic polyesters, which were quickly absorbable in vivo. In view of these deficiencies, it would be most desirable if an aromatic polyanhydride copolymer could be developed which was bioabsorbable. Accordingly, it would be desirable to prepare copolymers that contain an aromatic polyanhydride which exhibits the requisite bioabsorbability for the preparation of biomedical devices, especially using melt processing techniques such as injection or extrusion molding. Likewise, it would be desirable to prepare copolymers that contain aromatic polyanhydrides which have outstanding thermal and dimensional stability at elevated temperatures for prolonged periods, and the ability to maintain physical and biological properties upon sterilization using conventional irradiation techniques. All of these properties would be most beneficial in a bioabsorbable polymer which contains an aromatic polyanhydride for the preparation of biomedical devices, especially implantable wound closure devices and adhesion prevention barriers which are absorbable in bodily tissue without causing adverse tissue response or other adverse reactions.

SUMMARY OF THE INVENTION

In one aspect, the invention provides a novel copolymer of an aromatic polyanhydride and aliphatic ester.

In another aspect, the invention provides a process for preparing a copolymer of an aromatic anhydride and an aliphatic ester.

Unlike the aromatic polyanhydrides of the prior art, the copolymers prepared from an aromatic anhydride and an aliphatic ester exhibit suitable bioabsorbability profiles and the necessary physical properties for incorporation into sutures and other bioabsorbable devices. Moreover, their outstanding thermal stability has made it possible to melt process the copolymers of this invention. In combination with the mechanical properties of articles so produced, numerous applications of these copolymers can be utilized.

Furthermore, the aromatic anhydride/aliphatic ester copolymers described herein are relatively stable to the effects of conventional radiation treatments.

Therefore, the outstanding mechanical properties of these copolymers are not sacrificed when the copolymers are exposed to radiation required for sterilization of medical grade parts.

The aromatic anhydride/aliphatic ester copolymers exhibit desirable bioabsorbability when exposed to bodily tissue. The overall spectrum of properties for this new class of polymers is particularly well-suited for the preparation of biomedical devices, especially implantable wound closure devices such as surgical staples, clips and sutures. Furthermore, their application as drug delivery vehicles as well as adhesion prevention barriers should also be apparent.

BRIEF DESCRIPTION OF THE DRAWINGS

FIG. 1 illustrates a synthesis process for the preparation of a copolymers of an aromatic polyanhydride and a aliphatic ester. One embodiment of the inventive copolymer with representative repeating units is also shown in the FIG. 1.

FIG. 2 are plots of in vitro breaking strength resistance (BSR) profiles for a copolymer of 1,6-bis(p-carboxyphenoxy)hexane anhydride and glycolide (1,6 PA-PGA) before and after irradiation of this copolymer with cobalt.

FIG. 3 is a NMR of a copolymer of 1,6-bis(p-carboxyphenoxy)hexane anhydride, lactide and glycolide which demonstrates that transesterification has occurred between the anhydride and the aliphatic esters.

FIGS. 4-7 are plots of the in vitro breaking strength resistance (BSR) of copolymers of 1,4-bis(p-carboxyphenoxy)butane anhydride, lactide and glycolide, 1,4 PA-(PGA-PLA), and copolymers of 1,2-bis(p-carboxyphenoxy)ethane anhydride, lactide and glycolide, 1,2 PA-(PGA-PLA) illustrating the strength retention of these copolymers over time as a function of the monomer content.

DETAILED DESCRIPTION OF THE INVENTION

The aromatic anhydride/aliphatic ester copolymer of the present invention possess physical properties which render the copolymers suitable for drug delivery systems, extrusion into fibers or films, injection molding into surgical devices such as staples, clips and the like.

Generally these polymers contain a mole ratio of aromatic anhydride repeating unit to aliphatic ester repeating unit of from 95:5 to 5:95 and most preferably have a mole ratio of from 10:90 to 90:10. The lower limit of the aliphatic ester repeating unit is desirable because the addition of 5 mole percent of ester provides faster bioabsorbability to the copolymer. The lower limit of aromatic anhydride repeating unit is desirable because the addition of 5 mole percent of an aromatic anhydride allows the copolymer to be radiation sterilized using conventional irradiation techniques.

The aromatic anhydride repeating unit incorporated in the copolymer are provided by polymerizing an aromatic anhydride with an aliphatic ester. Suitable aromatic anhydride repeating units may be selected from the group consisting of aromatic repeating units having the formula:

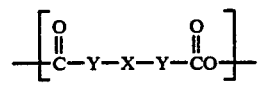

where Y is preferably a direct link but may be a divalent $-(CH_2)_n-$ or $-(CH_2)_nO-$ radical in which n may be from 1 to 4 and the ether oxygen, if present, is directly linked to X, and the:

groups are symmetrically disposed on the divalent aromatic radical X, wherein X is selected from the group consisting of

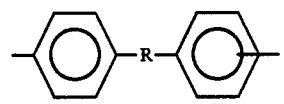

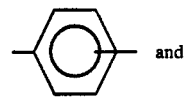

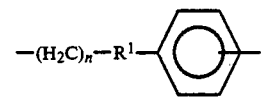

wherein R is selected from the group consisting of a $-(CH_2)_q-$ where q is an integer from 1 to 20, $-O-$, $-C(CH_3)_2-$, $(-O-(CH_2)_m)_n-$ where m is an integer form 1 to 20 and p is an integer form 0 to 20,

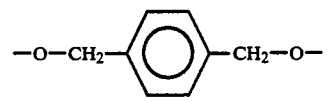

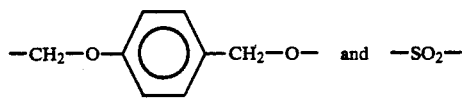

wherein $R^1$ is selected from the group consisting of $-O-$, $-C(CH_3)_2-$; and n is an integer from 1 to 4 and combination of two or more thereof. Preferred are aromatic anhydride repeating units selected from the group of aromatic repeating units having the formula:

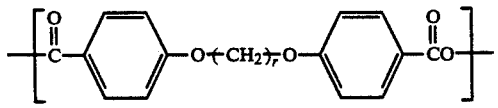

wherein r is an integer from 1-20; and

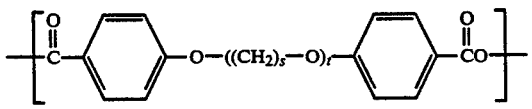

wherein s is an integer from 1-20 and t is an integer from 0-20.

Most preferred are aromatic repeating units wherein r is an integer from 2 to 6. Suitable monomers to provide these repeating units are aromatic anhydride monomers selected from the group consisting of 1,2-bis(p-carboxyphenoxy)ethane anhydride, 1,3-bis(p-carboxyphenoxy)propane anhydride, 1,4-bis(p-carboxyphenoxy)butane anhydride and 1,6-bis(p-carboxyphenoxy)hexane anhydride and combinations of two or more thereof.

Suitable aromatic anhydrides for use in the present invention may be prepared by known processes, such as by heating an appropriate aromatic dicarboxylic acid in the presence of an excess of an anhydride of a monofunctional carboxylic acid, such as acetic anhydride. Alternatively free acids or their alkali metal salts may be reacted with acyl chlorides to provide the desired aromatic anhydride. The conventional steps of reacting an aromatic dicarboxylic acid with an anhydride to form an aromatic anhydride monomer, isolating and purifying the monomer, are described in U.S. Pat. No. 4,757,128 (the "'128 patent") and Domb et al., J. of Polymer Sci., 25, 3373 (1987), each of which is incorporated by reference herein.

It is preferred for the practice of this invention that, a purified dicarboxylic acid essentially free of impurities be used to form the aromatic anhydride monomer. The purified dicarboxylic acid is "essentially free" of impurities if the amount of non-dicarboxylic or inert impurities contained in the acid is no greater than about 0.5 percent of the weight of the acid, preferably no greater than about 0.3 percent, and most preferably no greater than about 0.1 percent. If the concentration of impurities is greater than about 0.5 percent, then it may not be possible to carry out the melt polycondensation of the anhydride monomer under conditions sufficient to achieve an increased molecular weight which is necessary to obtain a molded article which, after melt processing, maintains excellent mechanical properties. One suitable method for forming an aromatic anhydride monomer from a purified dicarboxylic acid is disclosed in U.S. patent application Ser. No. 07/916,919, filed Jul. 20, 1992, titled *Aromatic Polyanhydrides*, the text of which is hereby incorporated by reference.

In a preferred embodiment of this invention, the aromatic anhydride monomer is prepared from an aromatic dicarboxylic acid by reacting an excess of the an anhydride at reflux for at least 60 minutes to form the anhydride monomer. This relatively longer reaction period, in comparison to the reaction time period of 15 minutes described in the previous literature, is advantageously sufficient to react substantially all of the acid with the anhydride. Therefore, in this embodiment, it becomes unnecessary to attempt removing unreacted anhydride from the reaction mixture. This may be significant because the unreacted anhydride may act as an impurity when the monomer is polymerized with the aliphatic ester under melt polycondensation conditions, causing a destabilizing effect on the molecular weight, chemical structure, and thermal stability of the aromatic anhydride/aliphatic ester copolymer prepared from this polymerization.

Suitable aliphatic ester comonomers may be selected form the group consisting of glycolide, lactide (l, d, dl or meso), trimethylene carbonate, p-dioxanone, dioxepanone, delta-valerolactone, beta-butyrolactone, epsilondecalactone, 2,5-diketomorpholine, pivalolactone, alpha, alpha-diethylpropiolactone, ethylene carbonate, ethylene oxalate, 3-methyl-1,4-dioxane-2,5-dione, 3,3-dimethyl 1,4-dioxane-2, 5-dione, 3-methyl-1,4-dioxane-2,5-dione, 3,3-diethyl-1,4- dioxan-2,5-dione, pivalolactone, gammabutyrolactone, 1,4-dioxepan-2-one, 1,5-dioxepan-2-one, 1,4-dioxan-2-one, 6-8-dioxabicyclooctane-7-one and combination of two or more thereof. Preferred aliphatic ester comonomers are selected from the group consisting of glycolide, lactide, p-dioxanone, trimethylene carbonate and combination of two or more thereof.

The aromatic anhydride/aliphatic ester copolymers are preferably prepared in a two-step polymerization process. The first step is the preparation of a aliphatic ester prepolymer via a melt ring-opening polymerization. The second step of the polymerization is a melt polycondensation.

Suitable methods for preparing the aliphatic prepolymers described above are well known in the art. The molecular weight of the prepolymer as well as its composition can be varied depending on the desired characteristic which the prepolymer is to impart to the copolymer. However, it is preferred that the aliphatic ester prepolymers from which the copolymer is prepared have a molecular weight that provides an inherent viscosity between about 0.2 to about 2.0 deciliters per gram (dl/g) as measured in a 0.1 g/dl solution of hexafluoroisopropanol (HFIP) at 25° C. Those skilled in the art will recognize that the aliphatic prepolymers described herein can also be made from one or more aliphatic esters. If two or more aliphatic esters are use to form the prepolymer then one of the aliphatic esters may be caprolactone.

The prepolymer of the aliphatic ester can be prepared by polymerizing the desired proportions of one or more aliphatic esters in the presence of an organometallic catalyst and an initiator at elevated temperatures. The organometallic catalyst is preferably a tin-based catalyst, e.g. stannous octoate, and is present in the monomer mixture at a mole ratio of monomer to catalyst ranging from about 15,000 to 80,000/1. The initiator is typically an alkanol, a glycol, a hydroxyacid, or an amine, and is present in the monomer mixture at a mole ratio of monomer to initiator ranging from about 100 to 5000/1. The polymerization is typically carried out at a temperature range from 80° to 220° C., preferably 160°-190° C., until the desired molecular weight and visco are achieved.

After the aliphatic ester prepolymer is prepared, the polymerization of the aromatic anhydride and aliphatic ester is preferably performed under melt polycondensation conditions at a temperature no less than about 200° C. under reduced pressure. Higher polymerization temperatures may lead to further increases in the molecular weight of the copolymer, which may be desirable for numerous applications. The exact reaction conditions chosen will depend on numerous factors, including the properties of the polymer desired, the viscosity of the reaction mixture, and the glass transition temperature and softening temperature of the polymer. The preferred reaction conditions of temperature, time and pressure can be readily determined by assessing these and other factors. For example if the temperature is increased during the melt polymerization, transesterification will be favored in the polycondensation which will result in the copolymer having a random polymeric structure. Similarly the polycondensation conditions can be controlled to favor the formation of block copolymers by, for example, lowering the temperature and/or shortening the reaction time.

Generally, after the aliphatic ester prepolymer is formed the temperature of the reaction mixture will be increased to about 220° C. and then one or more aromatic anhydride monomers or a prepolymer of an aromatic anhydride will be added with vigorous stirring to the aliphatic ester prepolymer. The polymerization reaction will be allowed to proceed for about 15 to 360 minutes at an elevated temperature. The temperature is then lowered to about 200° C. The polymerization may continue at this temperature until the desired molecular weight and percent conversion is achieved for the copolymer, which will typically take about 1 to 24 hours.

In another embodiment, copolymers of aromatic anhydride/aliphatic ester can be prepared by using a aromatic anhydride prepolymer polymerized under melt polycondensation conditions prior to being added to the aliphatic ester prepolymer. Once each individual prepolymer is isolated and purified, the aromatic anhydride prepolymers will be mixed with the aliphatic ester prepolymer and subjected to the desired conditions of temperature and time to copolymerize the prepolymers in a melt polycondensation polymerization and subsequently prepare the aromatic anhydride/aliphatic ester copolymer.

Suitable methods for preparing the aromatic anhydride prepolymers described above are well known in the art. The molecular weight of the prepolymer as well as its composition can be varied depending on the desired characteristic which the prepolymer is to impart to the copolymer. However, it is preferred that the aromatic anhydride prepolymers from which the copolymer is prepared have a molecular weight that provides an inherent viscosity between about 0.2 to about 2.0 deciliters per gram (dl/g) as measured in a 0.1 g/dl solution of chloroform ($CHCl_3$) at 25° C. Those skilled in the art will recognize that the aromatic anhydride prepolymers described herein can also be made from one or more aromatic anhydrides.

One of the beneficial properties of the aromatic polyanhydride/aliphatic ester copolymers made by the process of this invention is that the ester linkages are hydrolytically unstable, and therefore the polymer is bioabsorbable because it readily breaks down into small segments when exposed to moist bodily tissue. In this regard, while it is envisioned that co-reactants could be incorporated into the reaction mixture of the aromatic dicarboxylic acid and the anhydride for the formation of the anhydride prepolymer, it is preferable that the reaction mixture does not contain a concentration of any co-reactant which would render the subsequently prepared polymer nonabsorbable. Preferably, the reaction mixture is substantially free of any such co-reactants if the resulting polymer is rendered nonabsorbable, especially any reactants which possess aromatic polyester functionalities, which are well known to be nonabsorbable.

The copolymers of this invention desirably can exhibit a yield stress, e.g. tensile strength, greater than about 3000 psi, preferably greater than about 4500 psi. These tensile strengths can be achieved while varying the modulus and elongation of the polymer for desired applications, depending particularly on the chemical structure of the prepolymers chosen.

The copolymers of this invention can be melt processed by numerous methods to prepare a vast array of useful devices. These copolymers can be injection or compression molded to make implantable medical and surgical devices, especially wound closure devices. The preferred wound closure devices are surgical clips, staples and sutures.

Alternatively, the copolymers can be extruded to prepare fibers. The filaments thus produced may be fabricated into sutures or ligatures, attached to surgical needles, packaged, and sterilized by known techniques. The polymers of the present invention may be spun as multifilament yarn and woven or knitted to form sponges or gauze, (or non-woven sheets may be prepared) or used in conjunction with other molded compressive structures as prosthetic devices within the body of a human or animal where it is desirable that the structure have high tensile strength and desirable levels of compliance and/or ductility. Useful embodiments include tubes, including branched tubes, for artery, vein or intestinal repair, nerve splicing, tendon splicing, sheets for typing up and supporting damaged surface abrasions, particularly major abrasions, or areas where the skin and underlying tissues are damaged or surgically removed.

Additionally, the copolymers can be molded to form films which, when sterilized, are useful as adhesion prevention barriers. Another alternative processing technique for the copolymers of this invention includes solvent casting, particularly for those applications where a drug delivery matrix is desired.

In more detail, the surgical and medical uses of the filaments, films, and molded articles of the present invention include, but are not necessarily limited to:

Knitted products, woven or non-woven, and molded products including:

a. burn dressings
  b. hernia patches
  c. medicated dressings
  d. fascial substitutes
  e. gauze, fabric, sheet, felt or sponge for liver hemostasis
  f. gauze bandages
  g. arterial graft or substitutes
  h. bandages for skin surfaces
  i. suture knot clip
  j. orthopedic pins, clamps, screws, and plates
  k. clips (e.g., for vena cava)
  l. staples
  m. hooks, buttons, and snaps
  n. bone substitutes (e.g., mandible prosthesis)
  o. needles
  p. intrauterine devices (e.g., spermicidal devices)
  q. draining or testing tubes or capillaries
  r. surgical instruments
  s. vascular implants or supports t. vertebral discs
u. extracorporeal tubing for kidney and heart-lung machines
v. artificial skin and others.

As an additional aid to understanding the overall process for making the aromatic anhydrides/aliphatic ester copolymers described herein, FIG. 1 outlines a process scheme for the preparation of the copolymers.

The Examples set forth below are for illustration purposes only, and are not intended to limit the scope of the claimed invention in any way. Numerous additional embodiments within the scope and spirit of the invention will become readily apparent to those skilled in the art.

EXAMPLES

The following Examples describes a new copolymer of an aromatic anhydride and an aliphatic ester, potentially useful as biomedical devices, with high molecular weights.

In this synthetic process, the high molecular weight copoly(anhydride-ester) is prepared by a method consisting of reacting a prepolymerized aliphatic poly(ester) via a melt ring-opening polymerization at temperatures of 110° to 230° C. for 3 to 24 hours under an inert nitrogen atmosphere, followed by melt polycondensation with a highly pure aromatic mixed anhydride at temperatures of 110° to 230° C. under a high vacuum (<20 microns).

The various times and temperatures of the polymerization collaborate to yield aromatic poly(anhydride)-aliphatic poly(ester)s with high molecular weights.

In the examples, high molecular weight aromatic copoly(anhydride)-aliphatic(ester) polymers prepared from highly pure aromatic mixed anhydride monomers such as 1,6-bis(p-carboxyphenoxy)hexane, 1,4-bis(p-carboxyphenoxy) butane, and 1,2-bis(p-carboxyphenoxy)ethane, with aliphatic poly(ester)s based on lactone monomers such as glycolide, lactide, PDO, and others.

The polymers and monomers were characterized for chemical composition and purity (NMR, FT-IR, elemental analysis), thermal analysis (DSC), melt rheology (melt stability and viscosity), and molecular weight (inherent viscosity). Baseline and in-vitro mechanical properties (Instron stress/strain) were determined on molded cylindrical dumbbell test articles.

FT-IR was performed on a Nicolet FT-IR. Polymer samples were melt pressed into thin films. Monomers were pressed into KBr pellets. 1H NMR was performed on a 200 MHz NMR using CDCl3 as a reference. Elemental analysis was performed at Schwarzkopf Microanlytical Laboratories.

Thermal analysis of polymers and monomers was performed on a DuPont 912 Differential Scanning Calorimeter (DSC) at a heating rate of 10° C./min. A Fisher-Johns melting point apparatus was also utilized to determine melting points of monomers. Thermal gravimetric analysis was performed on a Dupont 951 TGA at a rate of 10° C./min. under a nitrogen atmosphere. Isothermal melt stability of the polymers was also determined by a Rheometrics Dynamic Analyzer RDA II for a period of 1 hour at temperatures ranging from 220° C. to 260° C. under a nitrogen atmosphere.

Inherent viscosities (I.V.) of the polymers were measured using a 50 bore Cannon-Ubbelhode dilution viscometer immersed in a thermostatically controlled water bath at 25° C. at a concentration of 0.025 gm/25 ml using an appropriate solvent. Molecular weight (melt viscosity) was also determined utilizing a Rheometrics Dynamic Analyzer RDA II at temperatures ranging from 160° C. to 290° C. at rate of 1° C./min. to 10° C./min. at frequencies of 1 $cm^{-1}$ to 100 $cm^{-1}$ under a nitrogen atmosphere.

The cylindrical dumbbells were prepared by utilizing a CSI Mini-max injection molder equipped with a dry nitrogen atmospheric chamber at temperatures ranging from 120° C. to 260° C. with a residence time of 2-3 minutes.

Baseline and in-vitro mechanical properties copolymers of the cylindrical dumbbells of the copolymers so produced were performed on an Instron model 1122 at a crosshead rate of 0.35 in/min. Specimen gauge length was 0.35 in., with a width of 0.06 in. Results are an average of 8 to 12 dumbbell specimens.

In-vitro studies were determined in a buffer solution (pH=7.27) at a temperature of 37° C. for periods of 1, 3, 6, and 9 weeks. Eight to 10 cylindrical dumbbells (2.4 to 3.0 grams) were placed in 100 ml of buffer solution. The buffer solution was replaced on a weekly basis. Sterilization of the dumbbells was conducted by Cobalt-60 irradiation at a dosage of 2.5 Mrad.

Several copolymer synthesis examples will be described in the following few pages:

EXAMPLE 1

Poly[1, 6-bis(p-carboxyphenoxy)hexane anhydride-glycolide]

Polymerization of 1,6-bis(p-carboxyphenoxy)hexane anhydride/glycolide 50/50 weight percent in the feed To a flamed-out, dry 250 ml 2-neck round bottom flask equipped with an overhead mechanical stirrer, vacuum adapter, 75° adapter, distillate bend with a vacuum take-off and a 50 ml collection flask, 15 grams of pure glycolide and 4.8 microliters of stannous octoate in a 0.33 molar toluene solution were added via a nitrogen purged glove box.

The assembly was then secured to a high vacuum (<10 microns) diffusion pump and placed in a high temperature oil bath at 180° C. under a flow of nitrogen. The stirred glycolide monomer immediately began to melt. After 30 minutes the viscosity began to increase. The low viscosity melt was then heated to 230° C. and 15 grams of freshly prepared 1,6-bis(p-carboxyphenoxy)hexane anhydride was added via a powder addition funnel. After 15 minutes the melt became uniform. It was then cooled to 200° C. and a strong vacuum was placed on the system and a high volume of distillate (acetic anhydride, acetic acid, and glycolide monomer) began to evolve, and was collected. After 30 minutes, the melt became viscous. The polymerization was then heated to 230° C. and allowed to continue under high vacuum (10 to 30 microns) with occasional stirring for 3 hours.

The high molecular weight polymer, poly-1,6-bis (p-carboxyphenoxy)hexane anhydride-poly(glycolide) copolymer (also referred to as 1,6-PA-PGA), was removed from the bath, cooled to room temperature under a stream of nitrogen, isolated and ground to a fine powder. The polymer was then placed under vacuum at 50° C. for 24 hours. The final yield was 70 to 75 percent.

Several other compositions were prepared under the same conditions. They are 90/10, 75/25, 25/75, and 10/90 wt. % 1,6-bis(p-carboxyphenoxy)hexane anhydride/glycolide. Table 1 describes the properties, including weight loss, of this series of poly(anhydride-ester) copolymers.

ence is observed in in-vitro properties between coupons subjected to cobalt versus unirradiated coupons.

TABLE 1

PROPERTIES OF POLY[1,6-BIS(CARBOXYPHENOXY)HEXANE ANHYDRIDE]-PGA COPOLYMERS

| CYLINDRICAL DUMBBELLS 1,6 PA-PGA | TENSILE STRENGTH (PSI) | % STRAIN AT YIELD | TENSILE MODULUS (PSI) | ACTUAL COMPOSIITON (WT %) | WT. LOSS* |
|---|---|---|---|---|---|
| 10-90 | 12500 | 6.2 | 192000 | 16-84 | 3% |
| 25-75 | 8300 | 6 | 149000 | 32-68 | 5% |
| 50-50 | 6900 | 6.7 | 108000 | 55-45 | 10% |
| 75-25 | 6100 | 7 | 88000 | 80-20 | 50% |
| 90-10 | 6100 | 7 | 87000 | 93-07 | 100% |

PGA = POLY(GLYCOLIDE)
STANDARD DEVIATION OF 5 TO 10%
DATA IS AN AVERAGE OF 5 TO 10 CYLINDRICAL DUMBBELLS
*WEIGHT LOSS IN REFLUXING CHLOROFORM EXTRACTION (1 GM/200 ML, 24 HRS.)

Since 1,6-polyanhydride is soluble in chloroform, the amount of unreacted or low molecular weight polyanhydride can be determined by the weight loss incurred in an extraction study of the copolymer. The data in Table 1 for the weight loss for the copolymer series is quite low for copolymers containing less than 50% polyanhydride. For example, a copolymer containing 32 wt. % polyanhydride lost less than 5 weight percent, well within experimental error. This indicates that the polymers are true copolymers and not blends of a homo-polyanhydride and homo-polyglycolide, since it would be expected that all of the polyanhydride would be extracted by refluxing chloroform if the polyanhydride had not reacted with the polyglycolide, a polymer that is quite insoluble in chloroform.

Properties of these copolymers such as physical strength and modulus lie between that of the homo-polyanhydride and polyglycolide. The copolymers physical properties ranged from yield strengths of 6,000 to 13,000 psi with moduli of 80,000 to 190,000 psi.

It was also believed that incorporation of aromatic poly(anhydride)s into the backbone of aliphatic lactone polymers would lead to cobalt sterilizable materials since previous work at Ethicon (U.S Pat. Nos. 4,510,295 and 4,532,928) and on aromatic homo-polyanhydrides has established that incorporation of aromatic substituents in the polymer backbone yields irradiation stability.

Consequently, test coupons of the 1,6-poly(anhydride-glycolide) were subjected to cobalt irradiation. The results of these tests are reported in Table 2.

Therefore, Table 2 establishes that the copolymers of an aromatic poly(anhydride)-aliphatic poly(glycolide)s can be cobalt irradiated without loss in physical properties. Since it is less likely that a blend would improve cobalt stability, this additional evidence suggests that the 1,6 PA is truly incorporated into the backbone of PGA.

EXAMPLE 2

Poly[1,6-bis(p-carboxyphenoxy)hexane anhydride-glycolide-lactide]

Polymerization of 1,6-bis(p-carboxyphenoxy) hexane anhydride/glycolide-lactide 90-10 50/50 weight percent in the feed To a flamed-out, dry 250 ml 2-neck round bottom flask equipped with an overhead mechanical stirrer, vacuum adapter, 75° adapter, distillate bend with a vacuum take-off and a 50 ml collection flask, 15 grams of pure glycolide, 1.86 grams of lactide, 135 microliters of ethylene glycol (DEG), and 3.33 microliters of a 0.333 molar solution of stannous octoate in toluene were added via a nitrogen purged glove box.

The assembly was then secured to a high vacuum (<10 microns) diffusion pump and placed in a high temperature oil bath at 185° C. under a flow of nitrogen. The stirred glycolide monomer immediately began to melt. After 30 minutes the viscosity began to increase. The low viscosity melt was then heated to 220° C. and allowed to stand for an additional 180 minutes.

TABLE 2

PROPERTIES OF POLY[1,6-BIS(CARBOXYPHENOXY)HEXANE ANHYDRIDE]-PGA COPOLYMERS 50/50

| CYLINDRICAL DUMBBELLS | TENSILE STRENGTH (PSI) | % STRAIN AT YIELD | TENSILE MODULUS (PSI) | YIELD* |
|---|---|---|---|---|
| UNIRRADIATED | 6600 | 6.6 | 125000 | YES |
| 1 WEEK IN-VITRO | 4200 | 4.1 | 100000 | NO |
| 3 WEEK IN-VITRO | 3200 | 4.6 | 64000 | NO |
| 4 WEEK IN-VITRO | 2000 | 3.8 | 56000 | NO |
| IRRADIATED (2.5 Mrad) | 6500 | 7 | 112000 | YES |
| 1 WEEK IN-VITRO | 4100 | 3.4 | 102000 | NO |
| 2 WEEK IN-VITRO | 3100 | 3.9 | 80000 | NO |
| 3 WEEK IN-VITRO | 2900 | 4.1 | 71000 | NO |
| 4 WEEK IN-VITRO | 2100 | 5 | 42000 | NO |

STANDARD DEVIATION OF 5 TO 10%
DATA IS AN AVERAGE OF 10 CYLINDRICAL DUMBBELLS
*YIELD = DID POLYMERS YIELD

No loss in the strength or modulus was observed at baseline. However, it is also important to establish the polymers physical characteristics as a function of exposure time in-vitro. This is a necessary requirement, since past work has shown that polymers subjected to cobalt may exhibit little change in physical/mechanical baseline properties, but when tested in-vitro rapidly lose all physical strength. As can be seen in FIG. 2, no differ- Then, 15 grams of freshly prepared 1,6-bis(p-carboxyphenoxy)hexane anhydride was added via a powder addition funnel. After 15 minutes the melt became uniform. The uniform melt was then placed under a strong vacuum and a high volume of distillate (acetic anhydride, acetic acid) began to evolve, and was collected. After 30 minutes, the melt became viscous. The polymerization was allowed to continue under high vacuum (10 to 30 microns) with occasional stirring for 3 hours.

The high molecular weight polymer, poly-1,6-bis(p-carboxyphenoxy)hexane anhydride-poly(glycolide-lactide) terpolymer, was removed from the bath, cooled to room temperature under a stream of nitrogen, isolated and ground to a fine powder. The polymer was then placed under vacuum at 50° C. for 24 hours. The final yield was 70 to 75 percent.

Several other compositions were prepared under the same conditions. They are 75/25 and 25/75 wt. % 1,6-bis(p-carboxyphenoxy)hexane anhydride/glycolide-lactide (Table 3). Since this polymer is soluble in HFIP, terpolymer or blend, of this material. NMR indicates that the anhydride and glycolide have transesterified (FIG. 3).

This evidence, along with the extraction studies and cobalt sterilization results, establishes that these polymers are true co- and terpolymers and not blends of a homo-polyanhydride and homo-polyglycolide or copolyglycolide-lactide.

Several compositions of 1,4-bis(p-carboxyphenoxy) butane anhydride/glycolide-lactide (90-10) as well as 1,2-bis(p-carboxyphenoxy)ethane anhydride/glycolide-lactide (90-10) have been prepared by the above method (Tables 3, 4, 5, 6, 7, 8, and 9).

TABLE 3

PROPERTIES OF 1,6 POLY(ANHYDRIDE)-(PGA—PLA 90-10) POLYMERS

| PA—PGA—PLA WT % (FEED) | BREAKING STRENGTH (PSI) | % STRAIN AT BREAK | TENSILE MODULUS (PSI) | YIELD* |
|---|---|---|---|---|
| 75/25 | 6500 | 127 | 133000 | YES |
| 50/50 | 9300 | 6 | 176000 | YES |
| 25/75 | 5000 | 2.4 | 196000 | SOME |
| 1,6 PA | 5000 | 150 | 50000 | YES |

STANDARD DEVIATION OF 5 TO 10%, PLA = POLY(LACTIDE)
DATA IS AN AVERAGE OF 5 TO 10 CYLINDRICAL DUMBBELLS
*YIELD = DID POLYMERS YIELD

TABLE 4

PROPERTIES OF 1,4 POLY(ANHYDRIDE)-(PGA—PLA 90-10) POLYMERS

| PA—PGA—PLA WT % (FEED) | BREAKING STRENGTH (PSI) | % STRAIN AT BREAK | TENSILE MODULUS (PSI) | YIELD* |
|---|---|---|---|---|
| 75/25 | 8400 | 55 | 137000 | YES |
| 50/50 | 8800 | 34 | 171000 | YES |
| 25/75 | 9800 | 7 | 191000 | YES |
| 1,4 PA | 7500 | 120 | 80000 | YES |

STANDARD DEVIATION OF 5 TO 10%
DATA IS AN AVERAGE OF 5 TO 10 CYLINDRICAL DUMBBELLS
*YIELD = DID POLYMERS YIELD

TABLE 5

PROPERTIES OF 1,4-POLYANHYDRIDE-(PGA—PLA 90-10) COPOLYMERS 50/50

| CYLINDRICAL DUMBBELLS | TENSILE STRENGTH (PSI) | % STRAIN AT BREAK | TENSILE MODULUS (PSI) | YIELD* |
|---|---|---|---|---|
| UNIRRADIATED | 8800 | 34 | 171000 | YES |
| 1 WEEK IN-VITRO | 7200 | 5.7 | 143000 | SOME |
| 2 WEEK IN-VITRO | 1900 | 1.6 | 108000 | NO |
| 3 WEEK IN-VITRO | 400 | 1.0 | 43000 | NO |

STANDARD DEVIATION OF 5 TO 10%
DATA IS AN AVERAGE OF 10 CYLINDRICAL DUMBBELLS
*YIELD = DID POLYMERS YIELD

TABLE 6

PROPERTIES OF 1,4-POLYANHYDRIDE-(PGA—PLA 90-10) COPOLYMERS 75/25

| CYLINDRICAL DUMBBELLS | TENSILE STRENGTH (PSI) | % STRAIN AT BREAK | TENSILE MODULUS (PSI) | YIELD* |
|---|---|---|---|---|
| UNIRRADIATED | 8400 | 55 | 137000 | YES |
| 1 WEEK IN-VITRO | 7500 | 16 | 106000 | YES |
| 2 WEEK IN-VITRO | 6000 | 7 | 102000 | SOME |
| 3 WEEK IN-VITRO | 4500 | 6 | 78000 | NO |
| 4 WEEK IN-VITRO | 3200 | 5 | 68000 | NO |

STANDARD DEVIATION OF 5 TO 10%
DATA IS AN AVERAGE OF 10 CYLINDRICAL DUMBBELLS

NMR has been utilized to investigate the true nature,

TABLE 7

PROPERTIES OF 1,2 POLY(ANHYDRIDE)-(PGA—PLA 90-10) POLYMERS

| PA—PGA—PLA WT % (FEED) | BREAKING STRENGTH (PSI) | % STRAIN AT BREAK | TENSILE MODULUS (PSI) | YIELD* |
|---|---|---|---|---|
| 75/25 | 11800 | 46 | 175000 | YES |
| 50/50 | 13000 | 13 | 235000 | YES |
| 25/75 | 12800 | 6 | 242000 | YES |

TABLE 7-continued

PROPERTIES OF 1,2 POLY(ANHYDRIDE)-(PGA—PLA 90-10) POLYMERS

| PA—PGA—PLA WT % (FEED) | BREAKING STRENGTH (PSI) | % STRAIN AT BREAK | TENSILE MODULUS (PSI) | YIELD* |
|---|---|---|---|---|
| 1,2 PA | 11300 | 80 | 115000 | YES |

STANDARD DEVIATION OF 5 TO 10%
DATA IS AN AVERAGE OF 5 TO 10 CYLINDRICAL DUMBBELLS
*YIELD = DID POLYMERS YIELD

TABLE 8

PROPERTIES OF 1,2-POLYANHYDRIDE-(PGA—PLA 90-10) COPOLYMERS 50/50

| CYLINDRICAL DUMBBELLS | TENSILE STRENGTH (PSI) | % STRAIN AT BREAK | TENSILE MODULUS (PSI) | YIELD* |
|---|---|---|---|---|
| UNIRRADIATED | 13000 | 13 | 235000 | YES |
| 1 WEEK IN-VITRO | 11300 | 7.4 | 202000 | YES |
| 2 WEEK IN-VITRO | 3900 | 2.1 | 167000 | NO |
| 3 WEEK IN-VITRO | 1500 | 2.0 | 87000 | NO |

STANDARD DEVIATION OF 5 TO 10%
DATA IS AN AVERAGE OF 10 CYLINDRICAL DUMBBELLS
*YIELD = DID POLYMERS YIELD

TABLE 9

PROPERTIES OF 1,2-POLYANHYDRIDE-(PG—PLA 90-10) COPOLYMERS 75/25

| CYLINDRICAL DUMBBELLS | TENSILE STRENGTH (PSI) | % STRAIN AT BREAK | TENSILE MODULUS (PSI) | YIELD* |
|---|---|---|---|---|
| UNIRRADIATED | 11800 | 46 | 175000 | YES |
| 1 WEEK IN-VITRO | 10300 | 10 | 163000 | SOME |
| 2 WEEK IN-VITRO | 6700 | 5 | 136000 | SOME |
| 3 WEEK IN-VITRO | 4300 | 11 | 88000 | SOME |
| 4 WEEK IN-VITRO | 2500 | 3 | 76000 | SOME |

STANDARD DEVIATION OF 5 TO 10%
DATA IS AN AVERAGE OF 10 CYLINDRICAL DUMBBELLS
*YIELD = DID POLYMERS YIELD

Tables 4 through 9 describe the properties of several 1,4 and 1,2 polyanhydride/glycolide-lactide terpolymers. Like the 1,6 PA-PGA 50-50, the 1,4 PA and 1,2 PA-PGA-PLA terpolymers were also molded into cylindrical dumbbells, and baseline as well as in-vitro physical properties were determined.

As can be seen from these tables and FIGS. 4 through 7, the yield strength and moduli are greater than that of 1,6 PA-PGA 50-50. This is as expected, since the 1,4 PA and 1,2 PA contain less methylene groups per repeat unit. This leads to a polymeric chain which is slightly stiffer and, therefore, causes a corresponding increase in yield strength and modulus.

It should also be apparent that the 1,4 and 1,2 PA-PGA-PLA 75-25 wt. % terpolymers have greater BSR at longer in-vitro time periods than the 50-50 wt. % terpolymers. This is as expected since these terpolymers have a larger percentage of polyanhydride than the 50-50 wt. % polymers.

The polyanhydrides have been shown to have a very broad range of BSR profiles, from an induction period where little loss of strength occurs in the first 3 to 6 weeks followed by a linear decrease in strength (i.e., 1,4 and 1,6 PA), to a linear decrease in strength without an induction period (i.e., 1,2 PA). With the incorporation of bulk degradation polymers such as PGA and PLA, an even broader range of BSR profiles is possible. This type of behavior is displayed in FIGS. 4 through 7.

EXAMPLE 3

Poly[1,2-bis(p-carboxyphenoxy)hexane anhydride]-poly(dioxanone)

To a flamed-out, dry 250 ml 2-neck round bottom flask equipped with an overhead mechanical stirrer, vacuum adapter, 75° adapter, distillate bend with a vacuum take-off and a 50 ml collection flask, 20 grams of pure PDO, 37 microliters of ethylene glycol (DEG), and 11.8 microliters of stannous octoate in a 0.333 molar solution in toluene were added via a nitrogen purged glove box.

The assembly was then secured to a high vacuum (<10 microns) diffusion pump and placed in a high temperature oil bath at 110° C. under a flow of nitrogen. The stirred PDO monomer immediately began to melt. After 30 minutes the viscosity began to increase. The low viscosity melt was allowed to stand at 110° C. for 6 hours. The polymerization was then continue for an additional 18 hours at 90° C.

Then, the temperature of the polymerization was raised to 110° C. and 15 grams of freshly prepared 1,2-bis(p-carboxyphenoxy)ethane anhydride was added via a powder addition funnel in the molten state. After 15 minutes the melt became uniform. The uniform melt was then placed under a strong vacuum and a high volume of distillate (acetic anhydride, acetic acid) began to evolve, and was collected. After 30 minutes, the melt became viscous. The polymerization was allowed to continue under high vacuum (10 to 30 microns) with occasional stirring for 3 hours.

The high molecular weight polymer was removed from the bath, cooled to room temperature under a stream of nitrogen, isolated and ground to a fine powder. The polymer was then placed under vacuum at 50° C. for 24 hours. The final yield was 70 to 75 percent.

A 75/25 wt. % 1,2-bis(p-carboxyphenoxy)ethane anhydride-PDO composition was also prepared under the same conditions.

EXAMPLE 4

Polymerization of 1,6-bis(p-carboxyphenoxy) hexane anhydride/acetoxybenzoic acid 75/25 weight percent in the feed The method descried below is similar to U.S. Pat. No. 4,414,381.

To a flamed-out, dry 250 ml 1-neck round bottom flask equipped with an overhead mechanical stirrer, vacuum adapter, 75° C. adapter, distillate bend with a vacuum take-off and a 50 ml collection flask, 33 grams of freshly prepared 1,6-bis(p-carboxyphenoxy)hexane anhydride and 11 grams of pure acetoxybenzoic acid were added via a nitrogen purged glove box.

The assembly was then secured to a high vacuum (<10 microns) diffusion pump and placed in a high temperature oil bath at 220° C. under a flow of nitrogen. The stirred anhydride monomer immediately began to melt. Shortly thereafter, acetoxybenzoic acid began to melt. Once the monomers had melted, a strong vacuum was placed on the system and a high volume of distillate (acetic anhydride, acetic acid) began to evolve, and was collected. After 15 to 20 minutes, the melt became viscous. The polymerization was allowed to continue under high vacuum (10 to 30 microns) with occasional stirring. The total reaction time was 200 minutes.

The high molecular weight polymer, poly-1,6-bis(p-carboxyphenoxy)hexane anhydride-poly(oxybenzoate) copolymer, was removed from the bath, cooled to room temperature under a stream of nitrogen, isolated and ground to a fine powder. The polymer was then placed under vacuum at 50° C. for 24 hours. The final yield was 70 to 75 percent.

Several other compositions were prepared under the same conditions. They are 95/5, 90/10, and 85/15 wt. % 1,6-bis(p-carboxyphenoxy)hexane anhydride/acetoxybenzoic acid.

Table 10 below compares the physical characteristics of several aromatic anhydride/aliphatic ester copolymers to aromatic anhydride/aromatic ester copolymers, an aromatic anhydride homopolymer and an aliphatic ester homopolymer.

mopolymer and the aromatic anhydride/aromatic ester copolymer.

This is a strong indication that incorporation of small proportions aliphatic polyesters into aromatic polyanhydrides increases the breakdown characteristics of aromatic polyanhydrides. While incorporation of small proportions of aromatic polyesters into aromatic polyanhydrides does not lead to increased hydrolysis, but actually slows hydrolysis rates for the polyanhydride, leading to nonabsorbable materials.

We claim:

1. A block or random copolymer composed of the reaction product of:
   a) a prepolymer formed from an aliphatic ester selected from the group consisting of glycolide, lactide (l, d, dl or meso), trimethylene carbonate, p-dioxanone, dioxepanone, delta-valerolactone, beta-butyrolactone, epsilondecalactone, 2,5-diketomorpholine, pivalolactone, alpha, alphadiethylpropiolactone, ethylene carbonate, ethylene oxalate, 3-methyl-1,4-dioxane-2,5-dione, 3,3-dimethyl 1,4-dioxane-2,5-dione, 3-methyl-1,4-dioxane-2,5-dione, 3,3-diethyl-1,4-dioxan-2,5-dione, pivalolactone, gamma-butyrolactone, 1,4-dioxepan-2-one, 1,5-dioxepan-2one, 1,4-dioxan-2-one, and 6-8-dioxabicyclooctane-7-one, and
   b) the balance of the copolymer comprising an aromatic repeating unit having the formula:

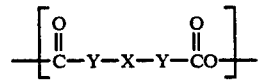

where Y is preferably a direct link but may be a divalent—$(CH_2)_n$—or —$(CH_2)_nO$—radical in which n may be from 1 to 4 and the ether oxygen, if present, is directly linked to X, and the:

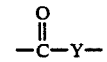

TABLE 10

| PHYSICAL PROPERTIES OF POLY[1,6-(CARBOXYPHENOXY)HEXANE ANHYDRIDE] COPOLYMERS | | | | |
|---|---|---|---|---|
| WT-WT % 1,6-PA—PE* | TENSILE STRENGTH (PSI) | ELONGATION TO BREAK (%) | TENSILE MODULUS (PSI) | HYDROLYSIS** |
| 90-10 1,6 PA—POB | 5700 | 170 | 51000 | 40 |
| 75-25 1,6 PA—POB | 7100 | 149 | 63000 | 51 |
| 50-50 1,6 PA—POB | 8200 | 26 | 66000 | 65 |
| 90-10 1,6 PA—PGA—PLA | 6400 | 120 | 87000 | 5 |
| 75-25 1,6 PA—PGA—PLA | 7000 | 100 | 133000 | 0 |
| 50-50 1,6 PA—PGA—PLA | 8500 | 25 | 149000 | 0 |
| 1,6 PA | 5000 | 150 | 50000 | 10 |
| PGA—PLA | 17000 | 20 | 200000 | 0 |

*1,6 PA = POLYANHYDRIDE
*PE = POLYESTER, POB = POLYOXYBENZOATE, PGA—PLA = POLY(GLYCOLIDE—LACTIDE) 90-10
**PERCENT POLYMER REMAINING AFTER 2 DAYS IN-VITRO AT 100 C. (pH = 7.27)

The data in Table 10 demonstrates that the aromatic anhydrides/aliphatic ester copolymers show improved tensile strength and tensile modulus as compared to the aromatic anhydride/aromatic ester copolymers. Additionally, the hydrolysis rate of the aromatic anhydride/aliphatic ester copolymer is significantly faster than the hydrolysis rate of the aromatic anhydride hogroups are symmetrically disposed on the divalent aromatic radical X wherein X is selected from the group consisting of

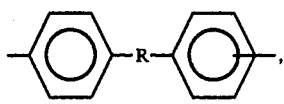

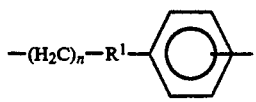

wherein R is selected from the group consisting of a —(CH$_2$)$_n$— where n is an integer from 1 to 20, —O—, —(C(CH$_3$)$_2$)—, —(O—(CH$_2$)$_m$)$_p$— where m is an integer from 1 to 20 and p is an integer from 0 to 20,

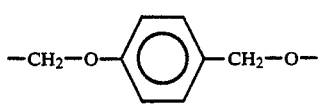

and

wherein R$^1$ is selected from the group consisting of —O—, —(C(CH$_3$)$_2$)—; and n is an integer from 1 to 4.

2. The copolymer of claim 1 wherein the prepolymer of the aliphatic ester is formed from one or more aliphatic esters selected from the group consisting of glycolide, lactide, trimethylene carbonate and p-dioxanone.

3. The prepolymer of claim 1 wherein additionally present in the prepolymer is caprolactone.

4. The copolymer of claim 1 wherein the aromatic repeating unit is selected from the group consisting of:

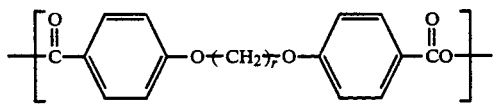

wherein r is an integer from 1–20; and

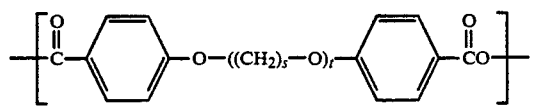

wherein s is an integer from 1–20 and t is an integer from 0–20.

5. The copolymer of claim 1 wherein the copolymer the aromatic repeating unit is

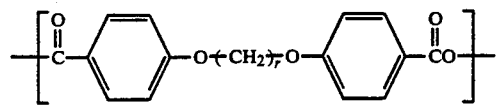

and r is an integer from 2 to 6.

6. A block or random copolymer composed of the reaction product of:
a) a prepolymer formed from an aliphatic ester selected from the group consisting of glycolide, lactide (l, d, dl or meso), trimethylene carbonate, p-dioxanone, dioxepanone and combination of two or more thereof; and
b) the balance of the copolymer comprising an aromatic repeating unit selected from the group consisting of:

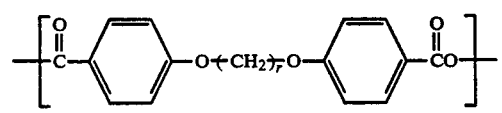

wherein r is an integer from 1–20; and

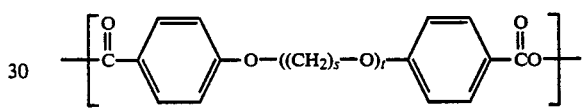

wherein s is an integer from 1–20 and t is an integer from 0–20.

7. The copolymer of claim 6 wherein additionally present in the prepolymer is caprolactone.

8. The copolymer of claim 6 wherein the copolymer is formed from 10-90 mole percent of the aliphatic ester and from 90-10 mole percent of the aromatic repeating unit.

9. The copolymer of claim 6 wherein the aromatic repeating unit is:

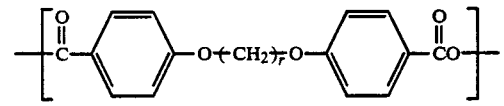

and r is an integer from 2 to 6.

10. The copolymer of claim 6 wherein the copolymer has a tensile strength greater than 3000 psi.

11. A surgical device formed from a copolymer having a tensile strength of at least 3000 psi and composed of the reaction product of:
a) a prepolymer formed from an aliphatic ester selected from the group consisting of glycolide, lactide (l, d, dl or meso), trimethylene carbonate, p-dioxanone, dioxepanone, delta-valerolactone, beta-butyrolactone, epsilondecalactone, 2,5-diketomorpholine, pivalolactone, alpha, alphadiethylpropiolactone, ethylene carbonate, ethylene oxalate, 3-methyl-1,4-dioxane-2,5-dione, 3,3dimethyl 1,4-dioxane-2,5-dione, 3-methyl-1,4-dioxane-2,5-dione, 3,3-diethyl-1,4- dioxan-2,5-dione, pivalolactone, gamma-butyrolactone, 1,4-dioxepan-2-one, 1,5-dioxepan-2one, 1,4-dioxan-2-one, and 6-8-dioxabicyclooctane-7-one, and b) the balance of the copolymer comprising one or more aromatic repeating units having the formula:

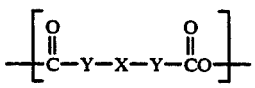

where Y is preferably a direct link but may be a divalent —(CH$_2$)$_n$— or —(CH$_2$)$_n$O— radical in which n may be from 1 to 4 and the ether oxygen, if present, is directly linked to X, and the:

groups are symmetrically disposed on the divalent aromatic radical X
wherein X is selected from the group consisting of

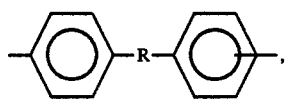

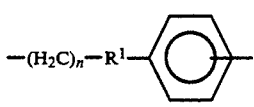

wherein R is selected from the group consisting of a —(CH$_2$)$_n$— where n is an integer from 1 to 20, —O—, —(C(CH$_3$)$_2$)—, —(O—(CH$_2$)$_m$)$_p$— where m is an integer from 1 to 20 and p is an integer from 0 to 20,

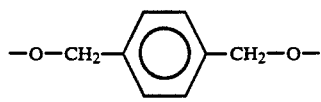

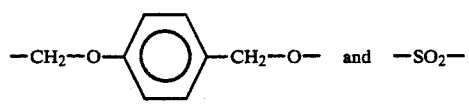

wherein R$^1$ is selected from the group consisting of —O—, —(C(CH$_3$)$_2$); and n is an integer from 1 to 4.

12. A surgical device selected from the group consisting of sutures, burn dressings, hernia patches, medicated dressings, fascial substitutes, gauze, fabric, sheet, felt, sponges, arterial graft, arterial substitutes, bandages for skin surfaces, suture knot clip, pins, clamps, screws, plates, hemostatic clips, staples, hooks, buttons, snaps, bone substitutes, needles, intrauterine devices, draining or testing tubes, capillaries, surgical instruments, vascular implants or supports, vertebral discs, extracorporeal tubing for kidney and heart-lung machines and artificial skin; formed from a copolymer having a tensile strength of at least 3000 psi and composed of the reaction product of:
a) a prepolymer formed from an aliphatic ester selected from the group consisting of glycolide, lactide (l, d, dl or meso), trimethylene carbonate, p-dioxanone, dioxepanone and combination of two or more thereof; and
b) the balance of the copolymer comprising an aromatic repeating unit having the formula:

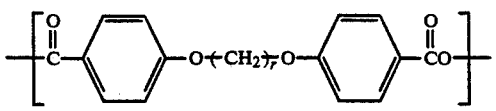

wherein r is an integer from 1–20; and

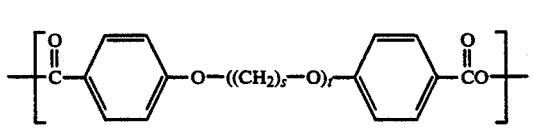

wherein s is an integer from 1–20 and t is an integer from 0–20.

13. The surgical device of claim 12 wherein the aromatic repeating unit is:

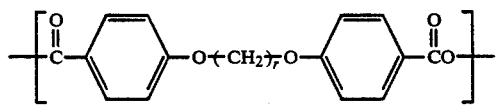

and r is an integer from 2 to 6.

14. A process for preparing a block or random copolymer comprising:
a) polymerizing a prepolymer from an aliphatic ester selected from the group consisting of glycolide, lactide (l, d, dl or meso), trimethylene carbonate, p-dioxanone, dioxepanone, delta-valerolactone, beta-butyrolactone, epsilondecalactone, 2,5-diketomorpholine, pivalolactone, alpha, alphadiethylpropiolactone, ethylene carbonate, ethylene oxalate, 3-methyl-1,4-dioxane-2,5-dione, 3,3dimethyl-1,4-dioxane-2,5-dione, 3-methyl-1,4-dioxane-2,5-dione, 3,3-diethyl-1,4- dioxan-2,5-dione, pivalolactone, gamma-butyrolactone, 1,4-dioxepan-2-one, 1,5-dioxepan-2-one, 1,4-dioxan-2-one, and 6-8-dioxabicyclooctane-7-one, and
b) melt polycondensating the prepolymer with one or more aromatic anhydrides derived from an aromatic dicarboxylic acid having the formula:

where Y is preferably a direct link but may be a divalent —(CH$_2$)$_n$— or —(CH$_2$)$_n$O— radical in which n may be from 1 to 4 and the ether oxygen, if present, is directly linked to X, and the:

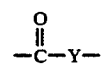

groups are symmetrically disposed on the divalent aromatic radical X wherein X is selected from the group consisting of

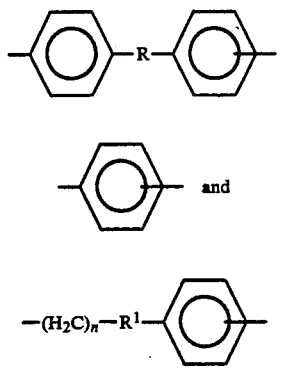

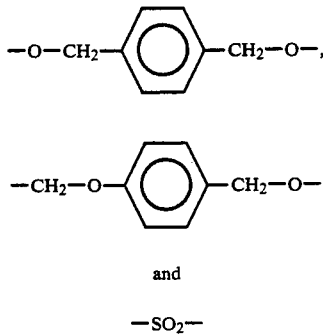

wherein R is selected from the group consisting of a —(CH$_2$)$_n$—where n is an integer from 1 to 20, —O—, —(C(CH$_3$)$_2$)—, —(O—(CH$_2$)$_m$)$_p$—where m is an integer from 1 to 20 and p is an integer from 0 to 20,

—O—CH$_2$—⌬—CH$_2$—O—,

—CH$_2$—O—⌬—CH$_2$—O— and

—SO$_2$— wherein R$^1$ is selected from the group consisting of —O—, —(C(CH$_3$)$_2$); and n is an integer from 1 to 4.

15. The process of claim 14 wherein the prepolymer additionally contains caprolactone.

16. The process of claim 14 wherein the copolymer is formed from a prepolymer of one or more aromatic anhydrides.

17. The process of claim 14 wherein the prepolymer formed from an aliphatic ester selected from the group consisting of glycolide, lactide (l, d, dl or meso), trimethylene carbonate, p-dioxanone, dioxepanone and combination of two or more thereof; and the prepolymer has an inherent viscosity between about 0.2 to about 2.0 deciliters per gram (dl/g) as measured in a 0.1 g/dl solution of hexafluoroisopropanol (HFIP) at 25° C.

18. The process of claim 17 wherein the prepolymer is melt polycondensed with an aromatic anhydride derived from an aromatic dicarboxylic acid having the formula:

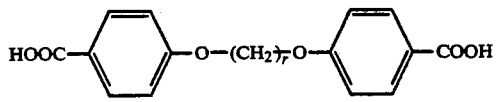

wherein r is an integer from 1–20; and

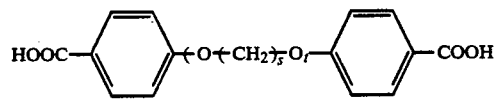

wherein s is an integer from 1–20 and t is an integer from 0–20.

19. The process of claim 14 wherein the melt polycondensation is performed under condition which will form a random copolymer.

20. The process of claim 14 wherein the melt polycondensation is performed under condition which will form a block copolymer.

* * * * *